United States Patent
Kim et al.

(10) Patent No.: US 12,034,147 B2
(45) Date of Patent: Jul. 9, 2024

(54) NEGATIVE ELECTRODE FOR LITHIUM SECONDARY BATTERY, METHOD FOR MANUFACTURING SAME, AND LITHIUM SECONDARY BATTERY COMPRISING SAME

(71) Applicant: LG CHEM, LTD., Seoul (KR)

(72) Inventors: Yong Chan Kim, Daejeon (KR); Ki Hwan Kim, Daejeon (KR); Jeong Woo Shon, Daejeon (KR); Pilsung Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 248 days.

(21) Appl. No.: 16/649,391

(22) PCT Filed: Sep. 19, 2018

(86) PCT No.: PCT/KR2018/011050
§ 371 (c)(1),
(2) Date: Mar. 20, 2020

(87) PCT Pub. No.: WO2019/059637
PCT Pub. Date: Mar. 28, 2019

(65) Prior Publication Data
US 2020/0303728 A1   Sep. 24, 2020

(30) Foreign Application Priority Data
Sep. 22, 2017 (KR) .................. 10-2017-0122655

(51) Int. Cl.
*H01M 4/36*   (2006.01)
*H01M 4/02*   (2006.01)
(Continued)

(52) U.S. Cl.
CPC ......... *H01M 4/364* (2013.01); *H01M 4/0404* (2013.01); *H01M 4/0426* (2013.01);
(Continued)

(58) Field of Classification Search
CPC .. H01M 4/364; H01M 4/0404; H01M 4/0426; H01M 4/131; H01M 4/133;
(Continued)

(56) References Cited

U.S. PATENT DOCUMENTS 9,673,447 B2   6/2017  Chen et al.
2007/0190416 A1  8/2007  Yamada et al.
(Continued)

FOREIGN PATENT DOCUMENTS

CN   101228652 A   7/2008
CN   103918107 A   7/2014
(Continued)

OTHER PUBLICATIONS

International Search Report issued in PCT/KR2018/011050 (PCT/ISA/210), dated Mar. 26, 2019.
(Continued)

*Primary Examiner* — Matthew T Martin
*Assistant Examiner* — Ankith R Sripathi
(74) *Attorney, Agent, or Firm* — Birch, Stewart, Kolasch & Birch, LLP (57) ABSTRACT

A negative electrode for a lithium secondary battery including a negative electrode current collector; and a negative electrode active material layer formed on the negative electrode current collector, wherein the negative electrode active material layer includes graphite and silicon oxide, and lithium is incorporated in the negative electrode active material layer, and a method for preparing the same.

4 Claims, 4 Drawing Sheets

(51) Int. Cl.
  *H01M 4/04* (2006.01)
  *H01M 4/131* (2010.01)
  *H01M 4/133* (2010.01)
  *H01M 4/1391* (2010.01)
  *H01M 4/1393* (2010.01)
  *H01M 4/48* (2010.01)
  *H01M 4/587* (2010.01)
  *H01M 10/0525* (2010.01)

(52) U.S. Cl.
  CPC ......... *H01M 4/0471* (2013.01); *H01M 4/131* (2013.01); *H01M 4/133* (2013.01); *H01M 4/1391* (2013.01); *H01M 4/1393* (2013.01); *H01M 4/483* (2013.01); *H01M 4/587* (2013.01); *H01M 10/0525* (2013.01); *H01M 2004/027* (2013.01)

(58) Field of Classification Search
  CPC ...... H01M 4/134; H01M 4/483; H01M 4/485; H01M 4/386; H01M 2004/027
  See application file for complete search history.

(56) References Cited

U.S. PATENT DOCUMENTS

| | | |
|---|---|---|
| 2009/0104538 A1 | 4/2009 | Kogetsu et al. |
| 2014/0349187 A1* | 11/2014 | Hirose ................. H01M 4/386 429/223 |
| 2014/0356723 A1 | 12/2014 | Suehiro et al. |
| 2015/0050541 A1 | 2/2015 | Kinoshita et al. |
| 2016/0006024 A1 | 1/2016 | Xiao et al. |
| 2017/0309899 A1 | 10/2017 | Son et al. |
| 2020/0388888 A1* | 12/2020 | Mikami ................. G06N 3/048 |

FOREIGN PATENT DOCUMENTS

| | | |
|---|---|---|
| CN | 104577086 A | 4/2015 |
| CN | 106229447 A | 12/2016 |
| JP | 2004-165097 A | 6/2004 |
| JP | 2005-38720 A | 2/2005 |
| JP | 2005-63805 A | 3/2005 |
| JP | 2006-120337 A | 5/2006 |
| JP | 2007-108423 A | 4/2007 |
| JP | 2007-242590 A | 9/2007 |
| JP | 2014-44921 A | 3/2014 |
| JP | 2015-46220 A | 3/2015 |
| JP | WO2013/094004 A1 | 4/2015 |
| KR | 10-2003-0042288 A | 5/2003 |
| KR | 10-0413796 B1 | 1/2004 |
| KR | 10-2005-0030762 A | 3/2005 |
| KR | 10-1284025 B1 | 7/2013 |
| KR | 10-2014-0032577 A | 3/2014 |
| KR | 10-2015-0021260 A | 3/2015 |
| KR | 10-1594784 B1 | 2/2016 |
| KR | 10-2017-0035165 A | 3/2017 |
| KR | 10-2017-0086003 A | 7/2017 |
| WO | WO 2013/099278 A1 | 7/2013 |
| WO | WO 2017/131997 A1 | 8/2017 |

OTHER PUBLICATIONS

Dahn et al., "Mechanisms for Lithium Insertion in Carbonaceous Materials," Science, American Association for the Advancement of Science, vol. 270, Oct. 27, 1995, pp. 590-593, XP000197427.

Extended European Search Report for European Application No. 18858820.6, dated Oct. 5, 2020.

* cited by examiner

NEGATIVE ELECTRODE FOR LITHIUM SECONDARY BATTERY, METHOD FOR MANUFACTURING SAME, AND LITHIUM SECONDARY BATTERY COMPRISING SAME

TECHNICAL FIELD

This application claims priority to and the benefits of Korean Patent Application No. 10-2017-0122655, filed with the Korean Intellectual Property Office on Sep. 22, 2017, the entire contents of which are incorporated herein by reference.

The present invention relates to a negative electrode for a lithium secondary battery and a method for preparing the same.

BACKGROUND ART

Interests in energy storage technologies have been increasingly higher recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and energy efficiency.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous solution electrolyte liquid.

A lithium secondary battery is generally formed by embedding an electrode assembly including a positive electrode, a negative electrode and a separator provided between the positive electrode and the negative electrode into a battery case in a laminated or wound structure, and injecting a non-aqueous electrolyte liquid thereinto. In order to use a lithium electrode as a negative electrode, lithium foil is attached on a planar current collector.

Lithium dendrite is formed due to irregular lithium formation and removal while progressing charge and discharge in a lithium secondary battery, which leads to a continuous capacity decrease. In order to resolve such issues, studies such as introducing a polymer protective layer or an inorganic solid protective layer to a lithium metal layer, increasing a concentration of a salt of a electrolyte liquid, or using proper additives have been currently progressed. However, effects of lithium dendrite suppression of such studies are insignificant. Accordingly, modifying a form of a lithium metal negative electrode itself or modifying a structure of a battery may become an effective alternative in resolving the problems.

PRIOR ART DOCUMENTS (Patent Document 1) Chinese Patent Application Laid-Open Publication No. 106229447 "Lithium Ion Battery"

DISCLOSURE

Technical Problem

As described above, existing lithium secondary batteries have problems of stability and performance decline caused by lithium dendrite produced on an electrode surface during charge and discharge. As a result of extensive studies in view of the above, the inventors of the present invention have found out that, by preparing a negative electrode active material having three constituents of lithium, graphite and SiO through free charging lithium ions to graphite and SiO instead of forming a separate layer on a negative electrode active material layer, a movement of overall negative electrode voltage is accompanied, and a design is changed depending on a lithiation (precharge) degree, and as a result, changes in the overall performance of a cell may be made. Through this, the inventors of the present invention have identified that changes in the positive/negative electrode use voltage, the cell capacity, the average voltage, the thickness, the balance in a negative electrode loading/positive electrode loading ratio (N/P ratio) and the like may be obtained ultimately accomplishing optimal energy density, cycle performance, swelling properties and the like, and have completed the present invention.

Accordingly, an aspect of the present invention provides a negative electrode for a lithium secondary battery including a negative electrode active material injecting lithium to graphite and silicon oxide (SiO) as above, a method for preparing the same, and a lithium secondary battery including the same.

Technical Solution

According to an aspect of the present invention, there is provided a negative electrode for a lithium secondary battery including a negative electrode current collector; and a negative electrode active material layer formed on the negative electrode current collector, wherein the negative electrode active material layer includes graphite and silicon oxide, and lithium (Li) is injected into the negative electrode active material layer.

Herein, the negative electrode for a lithium secondary battery of the present invention may further include, on the negative electrode active material layer, a thin film layer including any one or more materials selected from the group consisting of lithium fluoride (LiF), alumina ($Al_2O_3$), graphite, lithium phosphorus oxynitride (LiPON) and lithium sulfur oxynitride (LiSON).

According to another aspect of the present invention, there is provided a method for preparing a negative electrode for a lithium secondary battery including (a) forming a negative electrode active material layer by coating active material slurry including graphite and silicon oxide (SiO) on a negative electrode current collector; and (b) injecting lithium to the negative electrode active material layer by thermal evaporating or sputtering lithium (Li) on the negative electrode active material layer.

According to still another aspect of the present invention, there is provided a lithium secondary battery including a positive electrode, the negative electrode, a separator and an electrolyte liquid provided between both of the electrodes.

Advantageous Effects

A negative electrode for a lithium secondary battery according to the present invention, and a method for preparing the same prepare a negative electrode active material having three constituents of lithium, graphite and SiO through injecting lithium ions to graphite and SiO instead of forming a separate layer on a negative electrode active material layer, and accordingly, a movement of overall negative electrode voltage is accompanied, and a design is changed depending on a lithiation (precharge) degree, and as a result, changes in the overall performance of a cell may be made. Through this, changes in the positive/negative electrode use voltage, the cell capacity, the average voltage, the thickness, the balance in a negative electrode loading/positive electrode loading ratio (N/P ratio) and the like can be obtained ultimately accomplishing optimal energy density, cycle performance, swelling properties and the like.

BEST MODE

Hereinafter, the present invention will be described in detail so that those skilled in the art may readily implement the present invention. However, the present invention may be implemented in various different forms, and is not limited to the present specification.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

Figure 1:
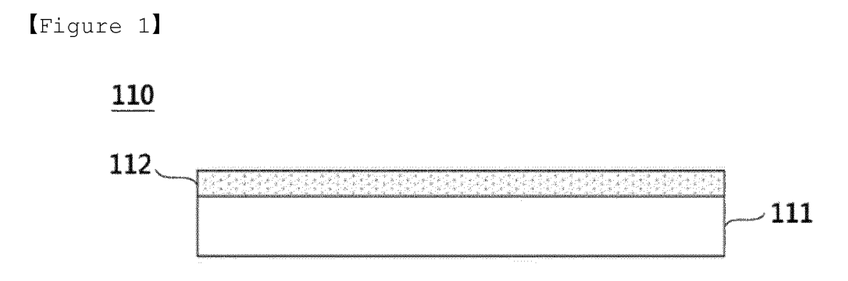
FIG. 1 is a structure illustrating one embodiment of a negative electrode for a lithium secondary battery of the present invention.

FIG. 1 is a diagram presenting a negative electrode (110) according to one embodiment of the present invention.

When referring to FIG. 1, the negative electrode for a lithium secondary battery (110) of the present invention includes a negative electrode current collector (111); and a negative electrode active material layer (112) formed on the negative electrode current collector.

Negative Electrode Active Material Layer

The negative electrode active material layer (112) according to the present invention includes graphite and silicon oxide, and lithium (Li) may be injected into the negative electrode active material layer.

The lithium (Li)-injected negative electrode active material layer may have a form of the lithium (Li) being injected into graphite and silicon oxide.

The lithium-injected negative electrode active material is prepared by injecting lithium ions into graphite (C) and silicon oxide (SiO) through thermal evaporating or sputtering lithium (Li) metal on graphite (C) and silicon oxide (SiO) forming the negative electrode active material layer.

By using a preparation method of thermal evaporating or sputtering lithium (Li) metal as above, the amount of injected lithium ions may be controlled by changing a molar concentration of the lithium metal used, or changing a thermal evaporation or sputtering condition.

The lithium injected into graphite and silicon oxide of the negative electrode active material of the present invention may be injected in 0.001 mol/cm$^2$ to 0.1 mol/cm$^2$, preferably in 0.005 mol/cm$^2$ to 0.05 mol/cm$^2$, and more preferably in 0.01 mol/cm$^2$ to 0.02 mol/cm$^2$ based on the molar concentration of the lithium ions.

The amount of lithium injection being less than 0.001 mol/cm$^2$ has a problem of an insignificant energy density increase caused through lithium pre-injection, and the amount being greater than 0.1 mol/cm$^2$ has a problem of an energy density decrease caused by volume expansion.

In such lithium-injected graphite, one lithium ion stores a lithium ion between 6 carbon atoms through an alloying reaction by the progress of such free charge resulting in a Li$_x$C$_6$ (0<x≤1) form.

In addition, in the lithium-injected silicon oxide, one lithium ion stores a lithium ion per 4.4 Si through an alloying reaction by the progress of such free charge resulting in a Li$_x$Si$_y$O (0<y/x≤4.4) form.

The negative electrode active material layer (112) may have its thickness controlled depending on the electrode form so as to readily prepare the electrode. The negative electrode active material layer (112) may have a thickness of 50 μm to 500 μm, and preferably 100 μm to 300 μm.

In addition, the negative electrode active material layer (112) may further include a negative electrode current collector on one side.

Negative Electrode Current Collector

The negative electrode current collector (111) according to the present invention is not particularly limited as long as it has high conductivity without inducing chemical changes to a battery, and may be selected from the group consisting of copper, aluminum, stainless steel, zinc, titanium, silver, palladium, nickel, iron, chromium, and alloys thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. A copper thin plate is generally used as the negative electrode current collector. In addition, as the form, various forms such as films with/without micro-unevenness formed on the surface, sheets, foil, nets, porous bodies, foams and non-woven fabrics may be used.

In addition, as the negative electrode current collector, those having a thickness range of 3 μm to 500 μm are used. When the negative electrode current collector has a thickness of less than 3 μm, a current collecting effect decreases, and the thickness being greater than 500 μm has a problem of processability decline when assembling a cell through folding.

Lithium (Li) Thin Film Layer

Figure 2:
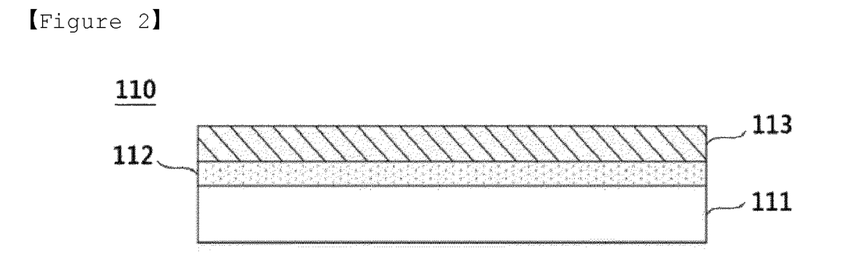
FIG. 2 is a structure illustrating another embodiment of a negative electrode for a lithium secondary battery of the present invention.

FIG. 2 is a diagram illustrating the negative electrode (110) according to another embodiment of the present invention.

When referring to FIG. 2, the negative electrode for a lithium secondary battery (110) of the present invention may further include a lithium (Li) thin film layer (113). As for the lithium thin film layer, excessive thermal evaporated or sputtered lithium metals may be formed as a lithium thin film layer on the negative electrode active material layer instead of being injected into the negative electrode active material layer when injecting lithium ions to the inside by thermal evaporating or sputtering lithium (Li) metal on graphite (C) and silicon oxide (SiO) forming the negative electrode active material layer.

The lithium thin film layer may have the thickness of the formed lithium thin film layer controlled by changing a molar concentration of the lithium metal used, or changing a thermal evaporation or sputtering condition.

The lithium thin film layer according to the present invention may be formed to have a thickness of less than 10 μm, and preferably less than 5 μm. The thickness of the lithium thin film layer being greater than 10 μm has a problem in that lithium is precipitated even at a low rate and an NP balance needs to be further increased considering high rate charge and discharge.

Protective Thin Film Layer

Figure 3:
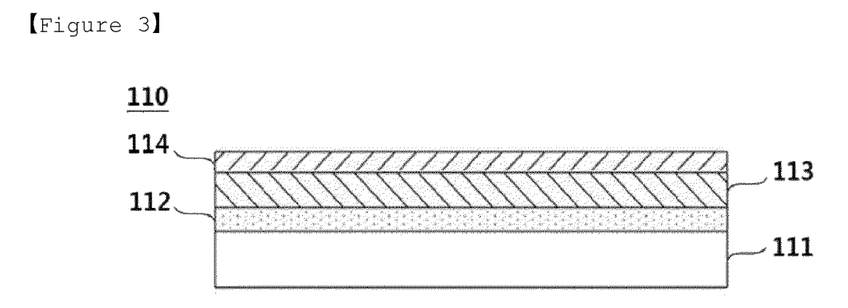
FIG. 3 is a structure illustrating still another embodiment of a negative electrode for a lithium secondary battery of the present invention.

FIG. 3 is a diagram illustrating the negative electrode (110) according to still another embodiment of the present invention.

When referring to FIG. 3, the negative electrode for a lithium secondary battery (110) of the present invention may further include a thin film layer (114) including any one or more materials selected from the group consisting of lithium fluoride (LiF), alumina ($Al_2O_3$), graphite, lithium phosphorus oxynitride (LiPON) and lithium sulfur oxynitride (LiSON). The thin film layer may be directly formed on the negative electrode active material layer when the lithium thin film layer described above is not present, or may be formed on the lithium thin film layer as in FIG. 3 when the lithium thin film layer is present.

Although the preparation will be described in detail in the preparation method of the present invention to describe later, the thin film layer (114) is formed on the lithium thin film layer or the negative electrode active material layer by thermal evaporating or sputtering any one or more materials selected from the group consisting of lithium fluoride (LiF), alumina ($Al_2O_3$), graphite, lithium phosphorus oxynitride (LiPON) and lithium sulfur oxynitride (LiSON). By preparing the thin film layer (114) using such a method of thermal evaporating or sputtering, the thickness of the thin film layer (114) may be controlled by changing a molar concentration of the thin film layer (114) including any one or more materials selected from the group consisting of lithium fluoride (LiF), alumina ($Al_2O_3$), graphite, lithium phosphorus oxynitride (LiPON) and lithium sulfur oxynitride (LiSON), or changing a thermal evaporation or sputtering condition.

The thin film layer (114) formed as above may have a function of delaying lithium deterioration when exposed to the atmospheric moisture.

The thin film layer (114) according to the present invention may be formed to have a thickness of 0.1 μm to 10 μm, and preferably 1 μm to 2 μm. When the thin film layer (114) has a thickness of less than 0.1 μm, a role of a moisture protective layer may not be performed, and when the thickness being greater than 10 μm has a problem in that overall cell properties decline since the layer functions as resistance during lithium intercalation and deintercalation.

Method for Preparing Negative Electrode

FIG. 1 is a diagram illustrating the negative electrode (110) according to one embodiment of the present invention.

When referring to FIG. 1, the negative electrode for a lithium secondary battery of the present invention is prepared through (a) forming a negative electrode active material layer by coating active material slurry including graphite and silicon oxide (SiO) on a negative electrode current collector; and (b) injecting lithium to the negative electrode active material layer by thermal evaporating or sputtering lithium (Li) on the negative electrode active material layer.

First, the method for preparing a negative electrode for a lithium secondary battery of the present invention includes (a) forming a negative electrode active material layer by coating active material slurry including graphite and silicon oxide (SiO) on a negative electrode current collector.

The active material slurry used in the step (a) includes graphite and silicon oxide. The active material slurry mixes the graphite and the silicon oxide in a weight ratio of 6:4 to 8:2, and may preferably mixes the graphite and the silicon oxide in a weight ratio of approximately 7:3. The graphite weight ratio being greater than the above-mentioned range has a problem of decreasing theoretical capacity, and the graphite weight ratio being less than the above-mentioned range has a problem of cycle reduction caused by silicon volume expansion.

The negative electrode current collector used in the step (a) is the same as the negative electrode current collector of the negative electrode examined above.

After that, the method for preparing a negative electrode for a lithium secondary battery of the present invention includes (b) injecting lithium to the negative electrode active material layer by thermal evaporating or sputtering lithium (Li) on the negative electrode active material layer.

Herein, the thermal evaporation in the step (b) may be, after evaporating lithium (Li) on the negative electrode active material layer to 0.1 μm to 10 μm, thermal evaporating the result for 30 minutes to 2 hours at an evaporation temperature of 600° C. to 700° C. with a working pressure of $10^{-7}$ torr to $10^{-5}$ torr. In addition, when evaporating lithium on the negative electrode active material layer, the lithium may be evaporated to 0.5 μm to 5 μm, and more preferably evaporated to 1 μm to 3 μm. By controlling the thickness of the evaporated lithium as above, the preparation method of the present invention is capable of controlling a molar concentration of lithium injected to the negative electrode active material layer.

The working pressure having a pressure of lower than $10^{-7}$ torr causes a problem of decreasing evaporation efficiency, and when the working pressure has a pressure higher than $10^{-5}$ torr, evaporation efficiency is too high causing a problem of making evaporation thickness control difficult. In addition, the evaporation temperature being lower than 600° C. causes a problem of decreasing evaporation efficiency, and when the evaporation temperature is higher than 700° C., evaporation efficiency is too high causing a problem of making evaporation thickness control difficult.

When thermal evaporating or sputtering lithium (Li) metal as above, the lithium metal evaporated on the negative electrode active material layer is injected into the negative electrode active material layer as time passes. By injecting lithium to the negative electrode active material layer while controlling the lithium thickness in this manner, the amount of lithium ions injected into graphite and silicon oxide of the negative electrode active material layer may be controlled by changing a molar concentration of the lithium metal, or changing a thermal evaporation or sputtering condition, and as necessary, a lithium thin film layer may also be formed on the negative electrode active material layer.

In addition, the method for preparing a negative electrode for a lithium secondary battery of the present invention may further include, after the step (b), (c) forming a lithium fluoride thin film layer by thermal evaporating or sputtering lithium fluoride (LiF).

In the step (c), the thin film layer may be formed by thermal evaporating or sputtering any one or more materials selected from the group consisting of lithium fluoride (LiF), alumina ($Al_2O_3$), graphite, lithium phosphorus oxynitride (LiPON) and lithium sulfur oxynitride (LiSON) in a similar manner as in the step (b). Herein, the thermal evaporation may be, after evaporating lithium fluoride on the negative electrode active material layer to 0.1 μm to 10 μm, thermal evaporating the result for 15 minutes to 1 hour at an evaporation temperature of 600° C. to 700° C. with a working pressure of $10^{-7}$ torr to $10^{-5}$ torr. In addition, in the sputtering, the material may be evaporated on the negative electrode active material layer by sputtering with a working pressure of 1 mtorr to 100 mtorr at a base pressure of $10^{-7}$ torr to $10^{-5}$ torr.

Lithium Secondary Battery

In the lithium secondary battery according to the present invention, constitutions other than structures and properties of the negative electrode described above may be prepared through known technologies implemented by those skilled in the art.

Hereinafter, the constitutions will be specifically described.

A positive electrode according to the present invention may be prepared to a positive electrode form by film-forming a composition including a positive electrode active material, a conductor and a binder on a positive electrode current collector.

The positive electrode active material may vary depending on the application of a lithium secondary battery, and known materials are used as the specific composition. As one example, the positive electrode active material may include any one lithium transition metal oxide selected from the group consisting of lithium cobalt-based oxides, lithium manganese-based oxides, lithium copper oxide, lithium nickel-based oxides, lithium manganese composite oxides and lithium-nickel-manganese-cobalt-based oxides, and more specifically, may include lithium manganese oxides such as $Li_{1+x}Mn_{2-x}O_4$ (herein, x is 0 to 0.33), $LiMnO_3$, $LiMn_2O_3$ or $LiMnO_2$; lithium copper oxide ($Li_2CuO_2$); vanadium oxides such as $LiV_3O_8$, $Li_3VO_4$, $V_2O_5$ or $Cu_2V_2O_7$; lithium nickel oxides represented by $LiNi_{1-x}M_xO_2$ (herein, M=Co, Mn, Al, Cu, Fe, Mg, B or Ga, and x=0.01 to 0.3); lithium manganese composite oxides represented by $LiMn_{2-x}MxO_2$ (herein, M=Co, Ni, Fe, Cr, Zn or Ta, and x=0.01 to 0.1) or $Li_2Mn_3MO_8$ (herein, M=Fe, Co, Ni, Cu or Zn), lithium-nickel-manganese-cobalt-based oxides represented by $Li(Ni_aCo_bMn_c)O_2$ (herein, 0<a<1, 0<b<1, 0<c<1, a+b+c=1), $Fe_2(MoO_4)_3$; elemental sulfur, disulfide compounds, organosulfur protective layers (organosulfur compounds) and carbon-sulfur polymers (($C_2S_x$)n: X=2.5 to 50, n≥2); graphite-based materials; carbon black-based materials such as Super-P, denka black, acetylene black, ketjen black, channel black, furnace black, lamp black, thermal black or carbon black; carbon derivatives such as fullerene; conductive fibers such as carbon fiber or metal fiber; fluorinated carbon, aluminum, metal powder such as nickel powder; conductive polymers such as polyaniline, polythiophene, polyacetylene or polypyrrole; forms supporting a catalyst such as Pt or Ru on a porous carbon support, or the like. However, the positive electrode active material is not limited thereto.

The conductor is a component for further enhancing conductivity of the positive electrode active material, and nonlimiting examples thereof may include graphite such as natural graphite or artificial graphite; carbon black such as carbon black, acetylene black, ketjen black, channel black, furnace black, lamp black or thermal black; conductive fibers such as carbon fiber or metal fiber; fluorinated carbon, aluminum, metal powder such as nickel powder; conductive whiskers such as zinc oxide or potassium titanate; conductive metal oxides such as titanium oxide; conductive materials such as polyphenylene derivatives, and the like.

The positive electrode may further include a binder for binding of the positive electrode active material and the conductor and for binding on the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

The positive electrode current collector is the same as described in the negative electrode current collector, and an aluminum thin plate may be generally used as the positive electrode current collector.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

The positive electrode composition may be coated on the positive electrode current collector using common methods known in the art, and for example, various methods such as a dipping method, a spray method, a roll coat method, a gravure printing method, a bar coat method, a die coating method, a comma coating method or a mixed method thereof may be used.

The positive electrode and the positive electrode composition that have gone through such a coating process go through solvent or dispersion medium evaporation, compactness of the coating layer and adhesion between the coating layer and the current collector through a drying process afterward. Herein, the drying is carried out using a common method, and is not particularly limited.

A common separator may be provided between the positive electrode and the negative electrode. The separator is a physical separator having a function of physically separating electrodes, and those commonly used as a separator may be used without particular limit, and particularly, those having an excellent electrolyte liquid moisture retention ability while having low resistance for ion migration of the electrolyte liquid are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Examples of the polyolefin-based porous membrane may include membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be included.

As the non-woven fabric other than the polyolefin-based non-woven fabric described above, non-woven fabrics formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte liquid of the lithium secondary battery is a lithium-salt containing electrolyte liquid, and may be an aqueous or non-aqueous electrolyte liquid, is specifically a non-aqueous electrolyte formed with an organic solvent electrolyte liquid and a lithium salt. In addition thereto, an organic solid electrolyte, an inorganic solid electrolyte or the like may be included, however, the electrolyte liquid is not limited thereto.

As the lithium salt, those commonly used in an electrolyte liquid for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types among these.

As the organic solvent included in the non-aqueous electrolyte liquid, those commonly used in electrolyte liquids for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, an electrolyte liquid having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous electrolyte liquid may be injected at a proper stage in an electrochemical device manufacturing process depending on a manufacturing process and required properties of a final product. In other words, the non-aqueous electrolyte liquid may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

Herein, depending on the positive electrode material and the separator type, the lithium secondary battery may be divided into various batteries such as a lithium-sulfur battery, a lithium-air battery, a lithium-oxide battery or a lithium all-solid-state battery, and depending on the shape, may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not included.

The lithium secondary battery according to the present invention may be used as a power supply of devices requiring high stability. Specific examples of the device may include power tools operated through receiving electric power by a battery motor; electric vehicles including electric vehicles (EV), hybrid electric vehicles (HEV), plug-in hybrid electric vehicles (PHEV) and the like; electric twowheeled vehicles including e-bikes, e-scooters and the like; electric golf carts; systems for power storage and the like, but are not limited thereto.

Hereinafter, preferred examples are provided in order to illuminate the present invention, however, the following examples are for illustrative purposes only, and it is obvious to those skilled in the art that various changes and modifications may be made within the category and technological ideas of the present invention, and such changes and modifications also fall within the scope of the attached claims.

EXAMPLE

Preparation of Negative Electrode

Example 1

Copper foil having a thickness of 100 μm was prepared as a negative electrode current collector. After that, with water as a solvent, active material slurry mixing an active material that mixed graphite and silicon oxide (SiO) in 70% by weight:30% by weight, a conductor (Super P), a binder (SBR BM480B) and an additive (CMC Daicel 2200) in 97.5:0.7:0.9:0.9 (active material:conductor:binder:additive) was prepared. The slurry was coated on the negative electrode current collector through wet coating, and the result was dried to prepare a negative electrode active material layer having a thickness of 150 μm.

After that, lithium metal was thermal evaporated on the negative electrode active material layer to a thickness of 1 μm, and thermal evaporation was progressed for 1 hour at an evaporation temperature of 640° C. with a working pressure $10^{-6}$ torr to prepare a negative electrode. When converting the amount of lithium injected to the negative electrode active material layer, 0.2068 mAh was obtained when evaporating Li to a thickness of 1 μm on the area of 1 cm$^2$, the charge was 0.74 C, and the molar concentration of the injected lithium was $7.7*10^{-6}$ mol/cm$^2$. A specific calculation formula was as follows.

Theoretical capacity of lithium: 3861 mAh/g
Li density: 0.534 g/cm$^3$
Capacity per unit volume: 2068 mAh/cm$^3$

Example 2

A negative electrode was prepared in the same manner as in Example 1 except that lithium metal was thermal evaporated on the negative electrode active material layer to a thickness of 2 μm, and then thermal evaporation was progressed for 1 hour at an evaporation temperature of 640° C. with a working pressure $10^{-6}$ torr to prepare a negative electrode. When converting the amount of lithium injected to the negative electrode active material layer, 0.4136 mAh was obtained when evaporating Li to a thickness of 2 μm on the area of 1 cm$^2$, the charge was 1.484 C, and the molar concentration of the injected lithium was $1.54*10^{-5}$ mol/cm$^2$. A specific calculation formula was as follows.

Theoretical capacity of lithium: 3861 mAh/g
Li density: 0.534 g/cm$^3$
Capacity per unit volume: 4136 mAh/cm$^3$

Example 3

A negative electrode was prepared in the same manner as in Example 1 except that lithium metal was thermal evaporated on the negative electrode active material layer to a thickness of 3 μm, and then thermal evaporation was progressed for 1 hour at an evaporation temperature of 640° C. with a working pressure $10^{-6}$ torr to prepare a negative electrode. When converting the amount of lithium injected to the negative electrode active material layer, 6204 mAh was obtained when evaporating Li to a thickness of 3 μm on the area of 1 cm$^2$, the charge was 2.226 C, and the molar concentration of the injected lithium was $2.31*10^{-5}$ mol/cm$^2$. A specific calculation formula was as follows.

Theoretical capacity of lithium: 3861 mAh/g
Li density: 0.534 g/cm$^3$
Capacity per unit volume: 6204 mAh/cm$^3$

Comparative Example 1

A negative electrode was prepared in the same manner as in Example 1 except that lithium was not thermal evaporated.

Experimental Example: Evaluation on Battery

A positive electrode was prepared by forming a lithium metal oxide layer having a composition of Ni:Mn:Co=8:1:1 on aluminum foil having a thickness of 100 μm. After that, the negative electrode prepared above was used, then a polyolefin separator was provided between the positive electrode and the negative electrode, and then a 1 M LiPF$_6$ salt-dissolved electrolyte liquid was injected thereto to manufacture a battery. The solvent composition in the electrolyte liquid was EC:PC:DMC=5:3:2.

(Evaluation on Battery Properties)

Figure 4:
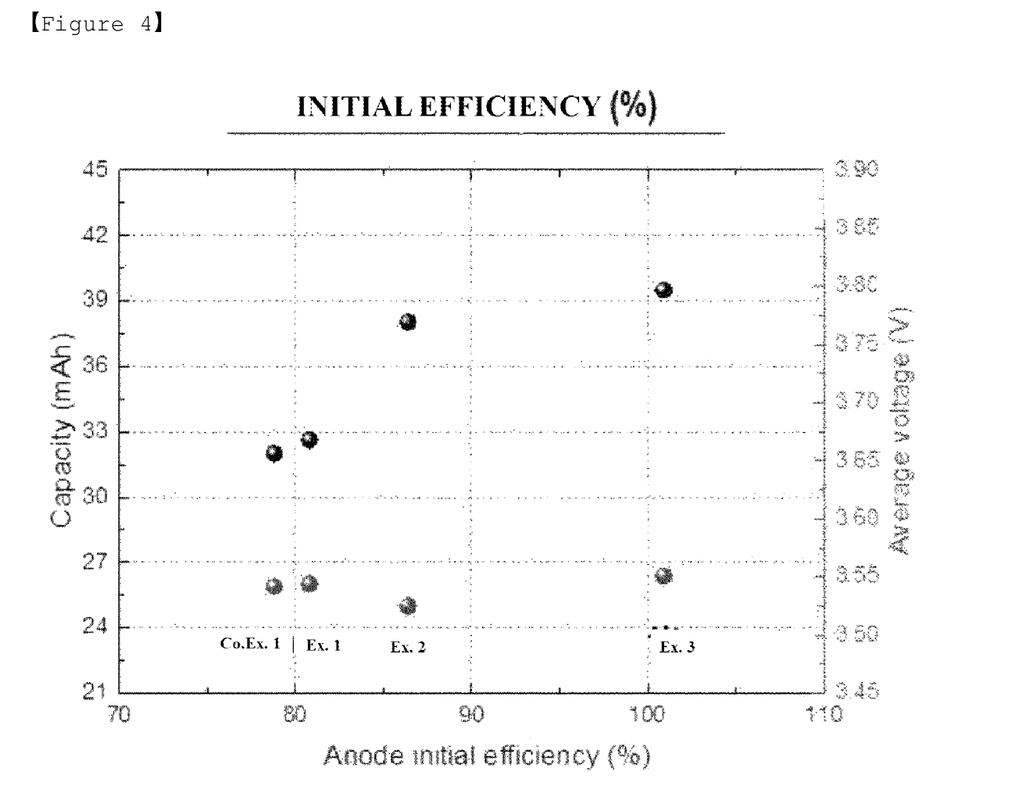
FIG. 4 is a graph showing initial efficiency in examples and a comparative example of the present invention.
Figure 5:
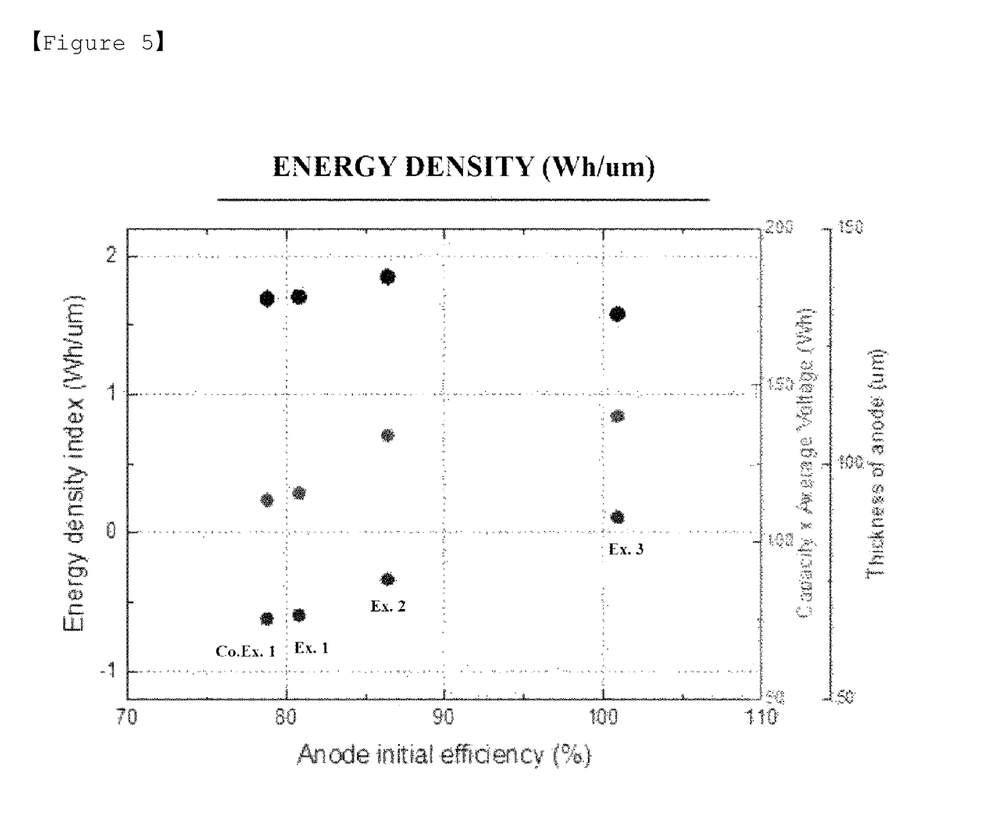
FIG. 5 is a graph showing energy density in examples and a comparative example of the present invention.

For each of the lithium secondary batteries manufactured using the negative electrodes of Example 1 to Example 3 and Comparative Example 1, properties were measured. Herein, the change in the thickness was measured once after progressing an initial activation process since it is a destructive test making an actual measurement after disassembling the cell, and energy density based on initial activation capacity was calculated. The results are shown in the following Table 1, FIG. 4 and FIG. 5.

TABLE 1

| | | | Negative Electrode Initial Efficiency Depending on Lithiation Degree | | | |
|---|---|---|---|---|---|---|
| | | | Comparative Example 1 | Example 1 | Example 2 | Example 3 |
| A | Capacity (mAh) | | 32.01 | 32.63 | 38.03 | 39.49 |
| B | Average voltage (V) | | 3.542 | 3.544 | 3.525 | 3.551 |
| C | Anode Active Material Thickness (um) | After Wetting | 42.7 | 43.2 | 47.4 | 55.7 |
| | | After Full Charge | 67.0 | 67.8 | 75.4 | 88.6 |
| $\frac{A+B}{C}$ | Energy Density Index (assuming that total length and total width are constant) Thickness change rate depending on SOC is constant) | Based on Wetting Thickness | 2.655 | 2.677 (0.8% Increase) | 2.828 (6.5% Increase) | 2.518 (5.2% Decrease) |
| | | Based on Full Charge Thickness | 1.692 | 1.705 (0.8% Increase) | 1.852 (6.5% Increase) | 1.583 (6.5% Decrease) |

TABLE 1-continued

| | Negative Electrode Initial Efficiency Depending on Lithiation Degree | | | |
|---|---|---|---|---|
| | Comparative Example 1 | Example 1 | Example 2 | Example 3 |
| Energy Density | 600.0 Wh/L | 604.7 Wh/L | 638.9 Wh/L | 561.2 Wh/L |

As shown in Table 1, it was seen that Example 2 had optimal energy density.

(Evaluation on Capacity Change)

Figure 6:
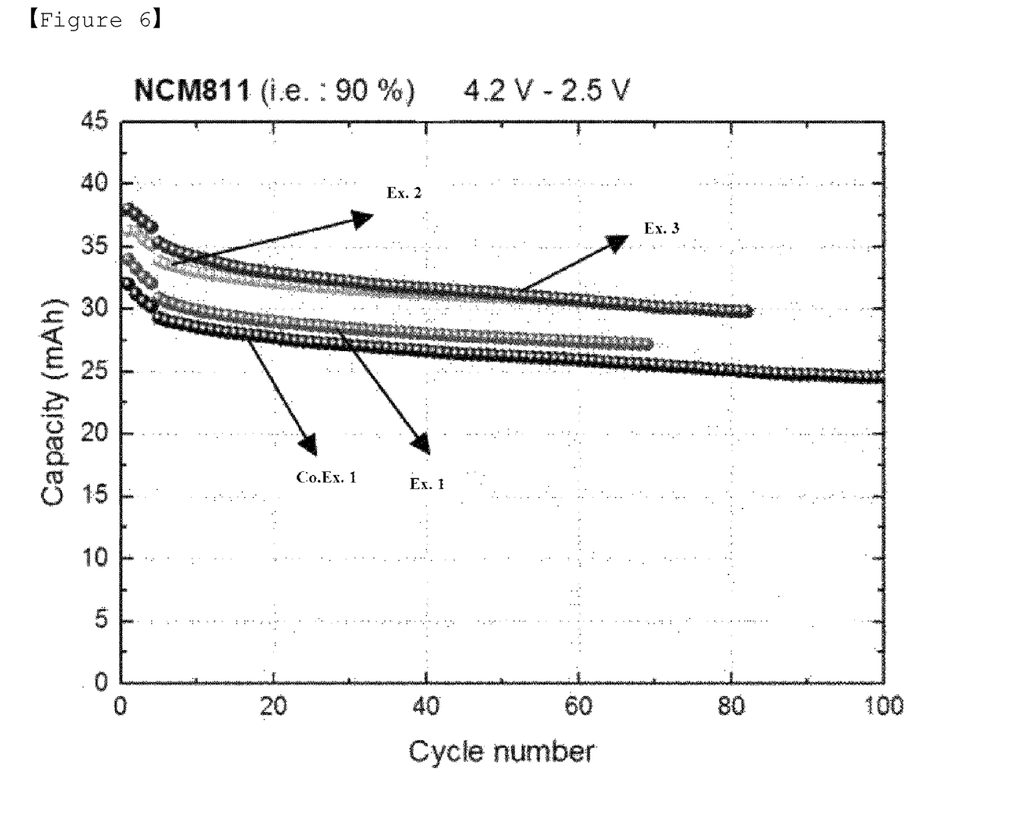
FIG. 6 is a graph showing capacity changes in examples and a comparative example of the present invention.

For each of the lithium secondary batteries manufactured using the negative electrodes of Example 1 to Example 3 and Comparative Example 1, charge capacity and discharge capacity in a charge/discharge process were measured by employing a charging voltage of 4.2 V cut and a rate of 0.5 C, and a discharging voltage of 2.5 V cut and a rate of 0.5 C, and changes depending on the cycle are shown in FIG. 6 as cycle capability data.

As shown in FIG. 6, it was seen that Examples 2 and 3 exhibited optimal effects.

REFERENCE NUMERICAL

110: Negative Electrode
111: Current Collector
112: Negative Electrode Active Material Layer
113: Lithium Thin Film Layer
114: Thin Film Layer

The invention claimed is:

1. A negative electrode for a lithium secondary battery comprising:

a negative electrode current collector; and a negative electrode active material layer formed on the negative electrode current collector; and a lithium thin film layer on the negative electrode active material layer having a thickness of 1 μm to 3 μm, wherein the negative electrode active material layer comprises graphite and silicon oxide, and lithium is incorporated in the negative electrode active material layer in an amount of $7.7 \times 10^{-6}$ mol/cm$^2$ to $2.31 \times 10^{-5}$ mol/cm$^2$, wherein the lithium is incorporated in the silicon oxide, and is represented by $Li_xSi_yO$, wherein $0 < y/x \leq 4.4$, wherein the lithium incorporated in the graphite is represented by $Li_xC_6$, wherein $0 < x \leq 1$, and wherein the graphite having lithium incorporated therein and the silicon oxide having lithium incorporated therein are present in a weight ratio of 6:4 to 8:2.

2. The negative electrode for a lithium secondary battery of claim 1, further comprising:

a thin film layer on the negative electrode active material layer, the thin film layer comprising one or more material selected from the group consisting of lithium fluoride (LiF), alumina (Al$_2$O$_3$), graphite, lithium phosphorus oxynitride (LiPON) and lithium sulfur oxynitride (LiSON).

3. The negative electrode for a lithium secondary battery of claim 2, wherein the thin film layer is formed to a thickness of 0.1 μm to 10 μm.

4. A lithium secondary battery comprising:

a positive electrode;

a negative electrode; and a separator and an electrolyte liquid provided between both of the electrodes, wherein the negative electrode is the negative electrode of claim 1.

* * * * *